(12) United States Patent
Wang et al.

(10) Patent No.: US 12,191,960 B2
(45) Date of Patent: Jan. 7, 2025

(54) TERMINAL AND BASE STATION OF WIRELESS COMMUNICATION SYSTEM, AND METHODS EXECUTED BY TERMINAL AND BASE STATION

(71) Applicant: NTT DOCOMO, INC., Tokyo (JP)

(72) Inventors: Xin Wang, Beijing (CN); Xiaolin Hou, Beijing (CN); Anxin Li, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 74 days.

(21) Appl. No.: 18/011,447

(22) PCT Filed: Apr. 9, 2021

(86) PCT No.: PCT/CN2021/086193
§ 371 (c)(1),
(2) Date: Dec. 19, 2022

(87) PCT Pub. No.: WO2021/253937
PCT Pub. Date: Dec. 23, 2021

(65) Prior Publication Data
US 2023/0246695 A1    Aug. 3, 2023

(30) Foreign Application Priority Data

Jun. 19, 2020   (CN) .......................... 202010568087.8

(51) Int. Cl.
*H04L 1/02*    (2006.01)
*H04B 7/0417*    (2017.01)
*H04B 7/06*    (2006.01)

(52) U.S. Cl.
CPC ......... *H04B 7/0658* (2013.01); *H04B 7/0417* (2013.01)

(58) Field of Classification Search
CPC .. H04B 7/0626; H04B 7/0413; H04B 7/0417; H04B 7/0452; H04B 7/0658;
(Continued)

(56) References Cited

U.S. PATENT DOCUMENTS

2014/0362939 A1* 12/2014 Kuo ..................... H04B 7/0632
375/267
2016/0365913 A1* 12/2016 Lau ....................... H04L 1/0029
(Continued)

FOREIGN PATENT DOCUMENTS

CN      109474316 A      3/2019
CN      110311718 A      10/2019
(Continued)

OTHER PUBLICATIONS

International Search Report issued in PCT/CN2021/086193 on Jun. 15, 2021 (2 pages).
(Continued)

*Primary Examiner* — Khai Tran
(74) *Attorney, Agent, or Firm* — Osha Bergman Watanabe & Burton LLP

(57) ABSTRACT

The present invention provides a terminal and a base station in a wireless communication system, and methods executed by the terminal and the base station. The terminal comprises: a processing unit, configured to perform characteristic domain transformation on a channel matrix to obtain a transformed channel characteristic and compress the transformed channel characteristic to obtain a compressed channel characteristic; and a transmitting unit, configured to transmit the compressed channel characteristic, as feedback information, to the base station.

13 Claims, 8 Drawing Sheets

(58) Field of Classification Search
CPC . H04B 7/061; H04L 25/0202; H04L 25/0224; H04W 72/21; H04W 72/046; H04W 72/02
USPC .......................................... 375/267, 260, 262
See application file for complete search history.

(56) References Cited

U.S. PATENT DOCUMENTS

2020/0220593 A1* 7/2020 Wen ..................... H04B 7/0626
2021/0099210 A1* 4/2021 Ramireddy ........... H04L 25/022

FOREIGN PATENT DOCUMENTS

| CN | 110350958 A | 10/2019 |
|----|-------------|---------|
| CN | 110912598 A | 3/2020  |

OTHER PUBLICATIONS

Written Opinion of the International Searching Authority issued in PCT/CN2021/086193 on Jun. 15, 2021 (4 pages).

Chen, M. et al.; "An overview of the CSI feedback based on deep learning for massive MIMO systems"; Chinese Journal on Internet of Things, vol. 4, No. 1, Mar. 2020 (12 pages).

* cited by examiner

TERMINAL AND BASE STATION OF WIRELESS COMMUNICATION SYSTEM, AND METHODS EXECUTED BY TERMINAL AND BASE STATION

TECHNICAL FIELD

The present disclosure relates to the field of wireless communication, and more particularly to a terminal and a base station in a wireless communication system and a method performed by the terminal and the base station.

BACKGROUND

Large-scale MIMO (multiple-input multiple-output) system can greatly increase the throughput of wireless communication system by configuring a large number of antennas at the base station and forming multiple independent channels in the spatial domain. It is one of the commonly used channel state acquisition methods that the user terminal obtains downlink channel state information through measurement and feeds it back to the base station. Considering that the base station uses a large number of antennas, the feedback of complete channel state information will lead to huge resource overhead. In practice, quantization or codebook-based method can be used to reduce the overhead, but this method will lose the channel state information to some extent, and the overhead will increase with the increase of the number of antennas.

SUMMARY

According to an aspect of the present disclosure, there is provided a terminal, which comprises a processing unit configured to perform characteristic domain transformation on a channel matrix to obtain transformed channel characteristics; compress that transformed channel characteristic to obtain compressed channel characteristics; a transmitting unit configured to transmit the compressed channel characteristics as feedback information to the base station.

In some embodiments, the processing unit is configured to perform characteristic domain transformation on the channel matrix using a first fully connected network.

In some embodiments, the processing unit is configured to convolve the transformed channel characteristics to obtain convolved transformed channel characteristics, and compress the convolved transformed channel characteristics to obtain compressed channel characteristics.

In some embodiments, the transformed channel characteristics and the channel matrix have the same size.

In some embodiments, the size of the transformed charnnel characteristics is smaller than the size of the channel matrix.

In some embodiments, the processing unit compresses the transformed channel characteristics using a second fully connected network.

According to another aspect of the present disclosure, there is also provided a base station including a receiving unit configured to receive feedback information from a terminal; a processing unit configured to decompress the feedback information to obtain decompressed feedback information; inverse characteristic domain transformation is performed on the decompressed feedback information to obtain channel state information feedback.

In some embodiments, the processing unit is configured to decompress the feedback information by using a third fully connected network to obtain decompressed feedback information. In some embodiments, before performing inverse characteristic domain transformation on the decompressed feedback information, the processing unit is further configured to denoise the decompressed feedback information.

In some embodiments, the processing unit is configured to perform inverse characteristic domain transformation on the decompressed feedback information by using the fourth fully connected network to obtain channel state information feedback.

According to yet another aspect of the present disclosure, there is also provided a training apparatus, including: an acquisition device configured to acquire a sample set including a plurality of channel matrix samples; the process device is configured to realize that follow steps by using a first neural network: transforming a channel matrix sample in a characteristic domain to obtain transform channel training characteristics; compressing the transformed channel training characteristics to obtain compressed channel training characteristics; the second neural network is used to realize the following steps: decompressing the training feedback information to obtain decompressed training feedback information; performing inverse characteristic domain transformation on the decompressed training feedback information to obtain channel state information training feedback; adjusting the parameters of the first neural network and the second neural network based on the difference between the channel state information training feedback and the channel matrix sample, so as to minimize the difference between the channel state information training feedback and the channel matrix sample; an output device configured to output the parameters of the trained first neural network and the parameters of the trained second neural network.

According to another aspect of the present disclosure, there is also provided a method executed by a terminal, which includes: performing characteristic domain transformation on a channel matrix to obtain transformed channel characteristics; compressing that transformed channel characteristic to obtain compressed channel characteristics; a transmitting unit configured to transmit the compressed channel characteristics as feedback information to the base station.

According to another aspect of the present disclosure, there is also provided a method executed by a base station, which includes receiving feedback information from a terminal; decompressing the feedback information to obtain decompressed feedback information; inverse characteristic domain transformation is performed on the decompressed feedback information to obtain channel state information feedback.

The terminal can compress the channel matrix received from the base station by using the method executed by the terminal and the corresponding terminal, the method executed by the base station and the corresponding base station provided by the disclosure. By transforming the channel matrix into the characteristic domain before compression, the channel data can be transformed into the characteristic domain which is easier to compress, which makes the data compression effect better. More accurate channel data can be recovered when the subsequent base station reconstructs the compressed feedback information.

BRIEF DESCRIPTION OF THE DRAWINGS

The above and other objects, characteristics and advantages of the present disclosure will become more apparent by describing the embodiments of the present disclosure in more detail with reference to the accompanying drawings.

The accompanying drawings are used to provide a further understanding of the embodiments of the present disclosure, and form a part of the specification. Together with the embodiments of the present disclosure, they serve to explain the present disclosure, and do not constitute a limitation on the present disclosure. In the drawings, the same reference numerals generally represent the same parts or steps.

FIGS. 10A-110C illustrate results of performance evaluation of a wireless communication system according to an embodiment of the present disclosure.

DETAILED DESCRIPTION OF THE EMBODIMENTS

Figure 1A:
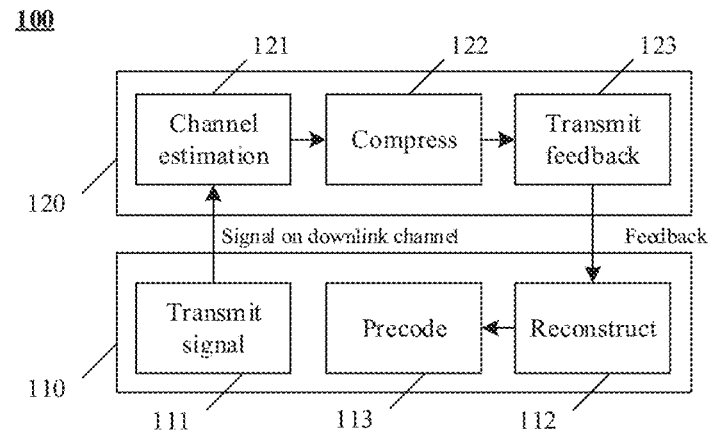
FIG. 1A is a schematic diagram of a wireless communication system in which an embodiment of the present disclosure can be applied.

In order to make the objects, technical solutions and advantages of the present disclosure more obvious, exemplary embodiments according to the present disclosure will be described in detail below with reference to the accompanying drawings. In the drawings, the same reference numerals refer to the same elements throughout. It should be understood that the embodiments described here are only illustrative and should not be construed as limiting the scope of the present disclosure. In addition, the terminals described here may include various types of terminals, such as user equipment (UE), mobile terminals (or mobile stations) or fixed terminals, however, for convenience, the terminals and UE are sometimes used interchangeably hereinafter.

Large-scale channel state information (CSI) feedback is needed in large-scale MIMO systems. High-precision CSI feedback can improve the performance of MIMO system, especially multi-user multiple-input multiple-output (MU-MIMO) and coordinated multiple points (CoMP).

In MU-MIMO system, traditional CSI feedback methods (such as new radio codebook feedback scheme and compressive sensing (CS) algorithm) are difficult to provide high-precision CSI feedback under the condition of limited feedback.

The existing channel state information network (CsiNet) uses the convolutional neural network (CNN) to compress and reconstruct the channel data in the wireless communication system. However, this method has good performance only for a single channel model. Because the actual channel characteristics are always different from the training set, there is a big performance loss in the actual deployment of network applications. The mean squared error (MSE) of user's channel reconstruction can only reach −12 dB when multiple channel models with different powers, delays and angles are mixed in different locations of the cell.

Therefore, a better method of channel data compression and reconstruction is needed, FIG. 1A is a schematic diagram of a wireless communication system in which an embodiment of the present disclosure can be applied. The wireless communication system may be a 5G system, such as a new radio (NR) system, or any other type of wireless communication system, such as a long term evolution (LTE) system or an LTE-A (advanced) system.

As shown in FIG. 1A, the wireless communication system 100 may include a base station 110 and a terminal 120, and the base station 110 is a serving base station of the terminal 120. The base station 110 may transmit signals to the terminal 120, and accordingly, the terminal 120 may receive signals from the base station 110. In addition, the terminal 120 may transmit a signal (e.g., feedback) to the base station 110, and accordingly, the base station 110 may receive a signal from the terminal 120. The terminal 120 may be configured with a signal processor (e.g., a signal encoder) supporting artificial intelligence, so as to process signals transmitted to the base station 110 through artificial intelligence. Accordingly, the base station 110 may configure a signal processor (e.g., a signal decoder) supporting artificial intelligence corresponding to the terminal 120, so as to process signals received from the terminal 120 through artificial intelligence.

It should be recognized that although only one base station and one terminal are shown in FIG. 1A, this is only schematic, and the wireless communication system may include multiple base stations and/or multiple terminals. Accordingly, the wireless communication system may include a plurality of cells. In addition, in this disclosure, the cell and the base station are sometimes used interchangeably.

As shown in FIG. 1A, in block 111, the base station 110 may transmit a signal on a downlink channel to the terminal 120. In block 121, the terminal 120 may receive the signal on the downlink channel from the base station 110 and perform channel estimation on the downlink control channel to obtain a channel matrix. Wherein the channel matrix includes channel data representing signals on the downlink channel.

Here, "signal on downlink channel" can be any received signal used to estimate downlink channel, such as reference signal (RS) on downlink control channel, traffic data on downlink data channel and/or demodulation reference signal (DMRS). In case that the base station is configured with RS and the RS configuration is available, the base station can transmit RS on the downlink control channel. The downlink control channel here may be, for example, a physical downlink control channel (PDCCH), a physical broadcast channel (PBCH), a physical control format indicator channel (PCFICH), etc. The reference signal here may be a channel state information reference signal (CSI-RS), a primary synchronization signal (PSS)/secondary synchronization signal (SSS), DMRS or synchronized signal block (SSB), etc. Hereinafter, the principle of the present disclosure will be described by taking the reference signal as a channel state information reference signal (CSI-RS) as an example.

In block 122, the terminal 120 may compress the channel matrix obtained by channel estimation to obtain compressed channel characteristics. In block 123, the terminal may transmit the compressed channel characteristics as feedback information to the base station 110. Before transmitting the feedback information, the terminal can perform possible transmitter processing such as quantization, coding, modulation and resource mapping on the compressed channel characteristics, and then transmit the processed compressed channel characteristics as feedback information.

The feedback information may be a channel state information reference signal (CSI), a reference signal receiving power (RSRP), reference signal receiving quality (RSRQ), signal to interference plus noise ratio (SINK), or synchronization signal block index (SSB-index). For example, if the feedback information is CSI, CSI may include channel quality indicator (CQI), preceding matrix indicator (PMI), rank indication (RI), CSI-RS indicator (CRI), channel direction information (CDI), characteristic vector of channel matrix, etc. Hereinafter, the principle of the present disclosure will be described by taking CSI feedback as an example.

In block 112, the base station 110 may receive CSI feedback. Because CSI feeds back compressed channel characteristics, the base station 110 can reconstruct CSI feedback information to recover channel data. Before reconstructing the CSI feedback information, the base station 110 may perform possible receiver processing such as inverse quantization, decoding and demodulation on the received feedback information, and then reconstruct the processed feedback information.

In block 113, the base station 110 may precode the signal on the downlink channel according to the reconstructed CSI feedback.

By applying the principle of the present disclosure in the wireless communication system shown in FIG. 1A, the terminal can efficiently and accurately compress the channel matrix determined from the received reference signal on the downlink channel, so that the base station can receive the feedback information with limited overhead.

Figure 1B:
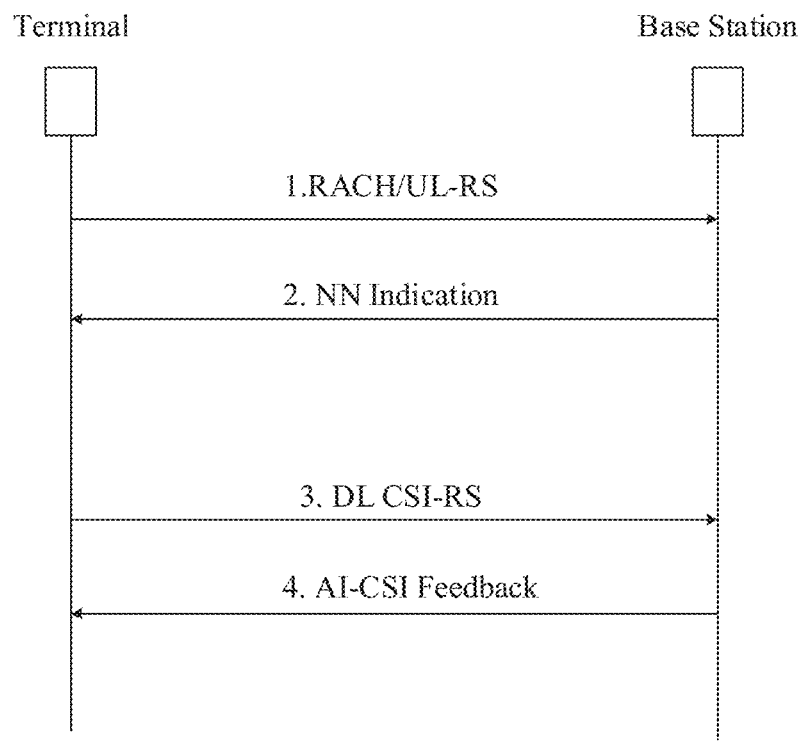
FIG. 1B illustrates an example of a signaling interaction process between a terminal and a base station according to an embodiment of the present disclosure.

FIG. 1B illustrates an example of a signaling interaction process between a terminal and a base station according to an embodiment of the present disclosure. As shown in FIG. 1B, a terminal may transmit a random access channel (RAM) or an uplink reference signal (UL-RS) to a base station via an uplink channel. The terminal can estimate the channel location of the base station and select a neural network (NN) for the terminal by using the RAM signal or the UL-RS signal.

Then, the base station can transmit the NN indication determined based on the selected neural network to the terminal.

In the process of wireless communication, the base station can transmit a downlink (DL) CSI-RS reference signal to the terminal. Based on the received CSI-RS reference signal, the terminal can perform channel estimation based on the selected neural network, and transmit AI-based CSI feedback (AI-CSI feedback) to the base station.

Figure 2:
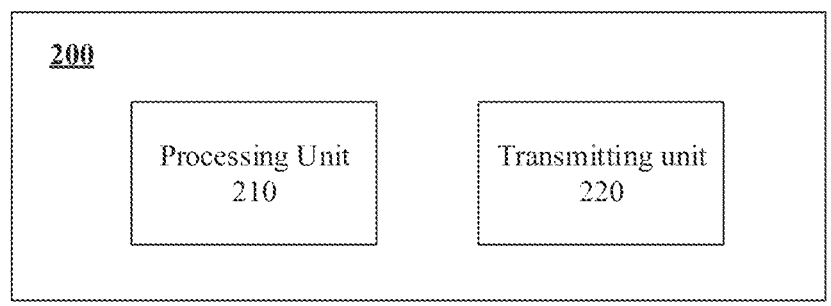
FIG. 2 shows a schematic block diagram of a terminal 200 according to an embodiment of the present disclosure.

FIG. 2 shows a schematic block diagram of a terminal 200 according to an embodiment of the present disclosure. As shown in FIG. 2, the terminal 200 may include a processing unit 210 and a transmitting unit 220. The terminal 400 may also include other components, however, since these components have nothing to do with the contents of the embodiments of the present disclosure, their illustrations and descriptions are omitted here.

The processing unit 210 may be configured to transform the channel matrix in the characteristic domain to obtain the transformed channel characteristics. The channel matrix may be received from the base station by a receiving unit (not shown).

In some embodiments, the terminal 200 may further include a pre-processing unit (not shown). The pre-processing unit can be used to pre-process the original channel matrix received from the base station to remove unnecessary data, thereby reducing the size of the channel matrix. In some implementations, pre-processing may include pre-defined domain transform (such as ITT transform, etc.). In case a pre-processing unit is included, the channel matrix described next in connection with FIG. 2 may be a pre-processed channel matrix.

In some embodiments, the processing unit 210 performs characteristic domain transformation on the (pre-processed) channel matrix by using the first fully connected network.

Figure 3:
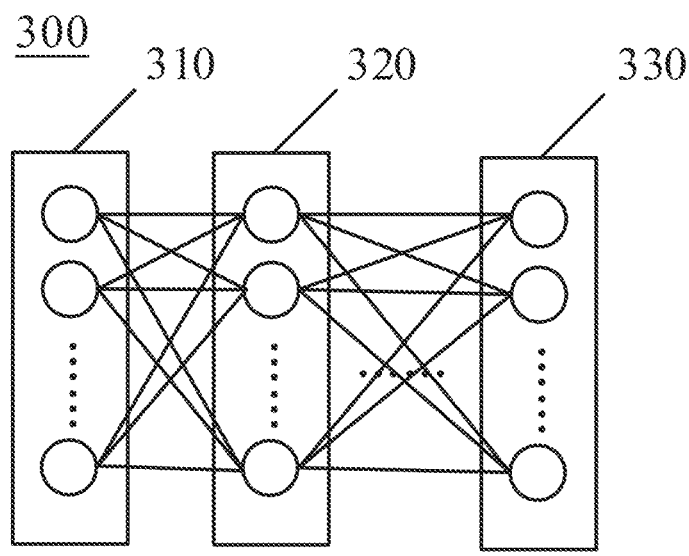
FIG. 3 shows an exemplary structure of a fully connected network.

FIG. 3 shows an exemplary structure of a fully connected network. As shown in FIG. 3, the fully connected network 300 may include an input layer 310, at least one intermediate layer 320, and an output layer 330. Each of the input layer 310, the at least one intermediate layer 320 and the output layer 330 includes a plurality of nodes (also called. neurons), and each node is fully connected with all the nodes in the previous layer. For any node in the current layer, the weighted sum of the outputs of all nodes in the previous layer can be used as the input of the current node. For the input layer, each node corresponds to each element in the input characteristic. The weight value used for each node here can be determined using the training process described later in this disclosure.

The nodes in the fully connected network can be configured as activation functions, so that the fully connected network can perform nonlinear transformation on the input. The activation function can be one or more of sigmoid function, hyperbolic tangent function, corrected linear unit (ReLU) function, and Leaky-ReLU function.

Referring back to FIG. 2, with the fully connected network shown in FIG. 3, the channel matrix can be transformed into a new characteristic domain from the current characteristic domain. The parameters of each node in the fully connected network used in this disclosure can be adjusted by the training process to be described later, so that the fully connected network can transform the channel data into the characteristic domain with better compression characteristics. So that more accurate channel data can be obtained after the compressed channel characteristics as feedback information are reconstructed at the base station.

In some embodiments, the sizes of the input layer and the output layer of the first fully connected network are equal. That is, the transformed channel characteristics output by the processing unit and the channel matrix input to the processing unit have the same size. In this case, the first fully connected network only realizes the characteristic domain transformation for the channel matrix without compressing the characteristics of the channel matrix.

In other embodiments, the size of the output layer of the first fully connected network is smaller than the size of the input layer of the first fully connected network. That is, the size of the transformed channel characteristics is smaller than the size of the channel matrix. In this case, the first fully connected network can not only transform the characteristic domain of the channel matrix, but also compress the characteristics of the channel matrix. The size of the output layer and the size of the input layer of the first fully connected network are not specifically limited here. Those skilled in the art can set it according to the actual situation. By configuring the first fully connected network, the channel data can be initially compressed while the characteristic domain is transformed, which can effectively reduce the complexity of the process of training the network and make the network easier to optimize and learn.

The processing unit 210 may also be configured to compress the transformed. channel characteristics to obtain compressed channel characteristics.

In some embodiments, the processing unit 210 may be configured to compress the transformed channel characteristics using the second fully connected network to obtain compressed channel characteristics. Wherein the size of the compressed channel characteristics is smaller than that of the transformed channel characteristics. The second fully connected network can adopt the structure shown in FIG. 3. The compression ratio can be determined by configuring the number of nodes in the input layer of the second fully connected network and the number of nodes in the output layer of the second filly connected network. For example, when the number of nodes in the output layer of the second fully connected network is one tenth of the number of nodes in the input layer of the second fully connected network, the data compression rate is 10%. Here, those skilled in the art can configure the second fully connected network according to the actual situation to obtain the desired compression ratio.

The structures of the first filly connected network and the second fully connected network may be the same or different. Those skilled in the art can set the number of intermediate layers in the first fully connected network and the second fully connected network and the number of nodes in each layer according to the actual situation. In the training process described later, the parameters for each node in the first fully connected network and the second fully connected network, such as the weight value for each node, can be adjusted respectively.

In some implementations, the nodes in the second fully connected network may not be configured with activation functions, so that the second fully connected network can linearly process the transformed channel characteristics and realize compression.

In some embodiments, before compressing the transformed channel characteristics, the processing unit 210 may be further configured to convolve the transformed channel characteristics to obtain convolved transformed channel characteristics. Then, the processing unit 210 may compress the convolved transformed channel characteristics to obtain compressed channel characteristics.

In some embodiments, the processing unit 210 may convolve the transformed channel characteristics using the first convolutional neural network. The first convolutional neural network may include an input layer, at least one hidden layer and an output layer. Those skilled in the art can configure the hidden layer of the first convolutional neural network according to the actual situation. In some implementations, the at least one hidden layer may include at least one of convolution layer, normalization layer (such as Batch Normalization layer, etc.) and activation layer (such as sigmoid, ReLU, etc.).

The first convolutional neural network can perform local characteristic processing on the transformed channel characteristics to realize the abstraction of local characteristics.

The transmitting unit 220 may be configured to transmit the compressed channel characteristics to the base station as feedback information.

In some embodiments, the transmitting unit may digitally encode and modulate the compressed channel characteristics, and then transmit the digitally encoded and modulated compressed channel characteristics to the base station as feedback information.

The coding and modulation scheme adopted here can be the existing coding and modulation scheme, modulation methods such as quadrature phase shift keying (QPSK), binary phase shift keying (BPSK), 16-quadrature amplitude modulation (QAM), or 64QAM, and coding methods such as Turbo, low-density parity-check (LDDC), and Polar.

With the terminal provided by the present disclosure, the channel matrix received from the base station can be compressed. By transforming the channel matrix into the characteristic domain before compression, the channel data can be transformed into the characteristic domain which is easier to compress, which makes the data compression effect better. More accurate channel data can be recovered when the subsequent base station reconstructs the compressed feedback information.

Figure 4:
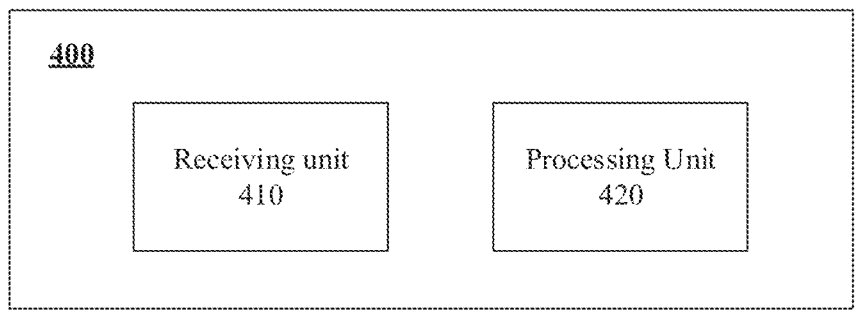
FIG. 4 shows a schematic block diagram of a base station 400 according to an embodiment of the present disclosure.

FIG. 4 shows a schematic block diagram of a base station 400 according to an embodiment of the present disclosure. As shown in FIG. 2, the base station 400 may include a receiving unit 410 and a processing unit 420. The base station 400 may also include other components, however, since these components have nothing to do with the contents of the embodiments of the present disclosure, their illustrations and descriptions are omitted here.

The receiving unit 410 may be configured to receive feedback information from the terminal. The feedback information here may be feedback information encoded, modulated or quantized by the terminal. In this case, the receiving unit 410 may perform corresponding inverse processing on the encoded, modulated or quantized feedback information to obtain the feedback information.

The processing unit 420 may be configured to decompress the received feedback information to obtain decompressed feedback information. In some embodiments, the processing unit 420 may be configured to decompress the feedback information by using a third fully connected network to obtain the decompressed feedback information. Wherein the structure of the third fully connected network can be configured to correspond to that of the second fully connected network, so as to realize the reverse process of the compression process for the second fully connected network. For example, the input layer, at least one intermediate layer and the output layer in the second fully connected layer can be arranged. and connected in reverse to determine the structure of the third fully connected network. The parameters of each node in the third fully connected network may be the same as or different from those of the corresponding node in the second fully connected layer.

The processing unit 420 may also be configured to perform inverse characteristic domain transformation on the decompressed feedback information to obtain channel state information feedback.

In some embodiments, the processing unit 420 may be further configured to denoise the decompressed feedback information before performing inverse characteristic domain transformation on the decompressed feedback information.

In some implementations, the processing unit 420 may convolve the decompressed feedback information by using the second convolutional neural network to remove noise that may exist in the decompressed feedback information. In some examples, the second convolutional neural network may include a plurality of convolutional layers in cascade.

In some embodiments, the processing unit 420 may use the fourth fully connected network to perform inverse characteristic domain transformation on the decompressed feedback information to obtain channel state information feedback. Wherein the structure of the fourth fully connected network can be configured to correspond to that of the first fully connected network, so as to realize the inverse process of characteristic domain transformation for the first fully connected network. For example, the input layer, at least one intermediate layer and the output layer in the first fully connected layer can be arranged and connected in reverse to determine the structure of the fourth fully connected network. The parameters of each node in the fourth fully connected network may be the same as or different from those of the corresponding node in the second fully connected layer. When the size of the output layer of the first fully connected network is smaller than the size of its input layer, that is, when the first fully connected network is configured to compress the characteristics of the channel matrix, the fourth fully connected network may be configured to decompress the characteristics at the same time as the inverse characteristic domain transformation. In this case, the structure of the fourth fully connected network may be symmetrical with that of the first fully connected network, and the size of the output layer of the fourth fully connected network is larger than that of its input layer.

In some embodiments, the base station 400 may further include a post-processing unit (not shown) when a pre-processing unit is included in the terminal. The post-processing unit may be configured to perform the inverse operation of the pre-processing operation to restore the channel matrix to its original format. For example, the post-processing unit can be configured to perform the inverse transform of the pre-processing domain transform operation (such as inverse FFT), fill in the matrix content removed during the pre-processing, and so on.

With the base station provided by the embodiment of the present disclosure, the transformed and compressed channel data can be received from the terminal as feedback information, and the compressed data can be decompressed and inversely transformed according to the inverse process corresponding to the compression process of the terminal to recover the channel data.

Figure 5:
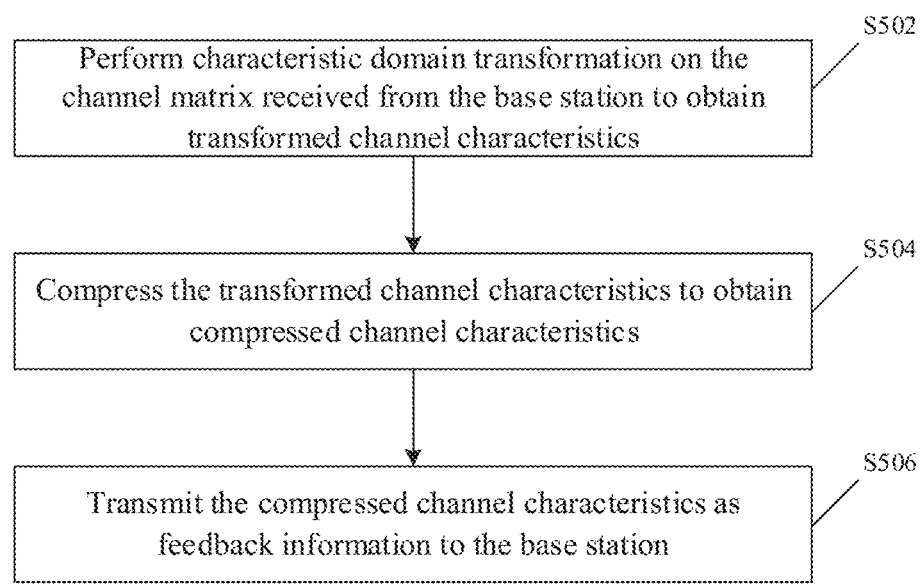
FIG. 5 shows a flowchart of a method 500 executed by a terminal according to an embodiment of the present disclosure.

FIG. 5 shows a flowchart of a method 500 executed by a terminal according to an embodiment of the present disclosure.

As shown in FIG. 5, in step S502, the terminal may perform characteristic domain transformation on the channel matrix received from the base station to obtain transformed channel characteristics.

In some embodiments, the terminal may also pre-process the original channel matrix received from the base station to remove unnecessary data, thereby reducing the size of the channel matrix. In some implementations, pre-processing may include predefined domain transform (such as FFT transform, etc.). The channel matrix described next in connection with FIG. 5 may be a pre-processed channel matrix.

In some embodiments, the terminal can use the first fully connected network to perform characteristic domain transformation on the (pre-processed) channel matrix.

With the fully connected network shown in FIG. 3, the terminal can transform the channel matrix into a new characteristic domain from the current characteristic domain. The parameters of each node in the fully connected network used in this disclosure can be adjusted by the training process to be described later, so that the fully connected network can transform the channel data into the characteristic domain with better compression characteristics. So that more accurate channel data can be Obtained after the compressed channel characteristics as feedback information are reconstructed at the base station.

In some embodiments, the sizes of the input layer and the output layer of the first fully connected network are equal. That is, the transformed channel characteristics output by the processing unit and the channel matrix input to the processing unit have the same size. In this case, the first fully connected network only realizes the characteristic domain transformation for the channel matrix without compressing the characteristics of the channel matrix.

In other embodiments, the size of the output layer of the first fully connected network is smaller than the size of the input layer of the first fully connected network. That is, the size of the transformed channel characteristics is smaller than the size of the channel matrix. In this case, the first fully connected network can not only transform the characteristic domain of the channel matrix, but also compress the characteristics of the channel matrix. The size of the output layer and the size of the input layer of the first fully connected network are not specifically limited here. Those skilled in the art can set it according to the actual situation. By configuring the first fully connected network, the channel data can be initially compressed while the characteristic domain is transformed, which can effectively reduce the complexity of the process of training the network and make the network easier to optimize and learn.

In step S504, the terminal may compress the transformed channel characteristics to obtain compressed channel characteristics.

In some embodiments, the terminal may compress the transformed channel characteristics by using the second fully connected network to obtain compressed channel characteristics, Wherein the size of the compressed channel characteristics is smaller than that of the transformed channel characteristics. The second fully connected network can adopt the structure shown in FIG. 3, The compression ratio can be determined by configuring the number of nodes in the input layer of the second fully connected network and the number of nodes in the output layer of the second fully connected network. For example, when the number of nodes in the output layer of the second fully connected network is one tenth of the number of nodes in the input layer of the second fully connected network, the data compression rate is 10%. Here, those skilled in the art can configure the second fully connected network according to the actual situation to obtain the desired compression ratio, In some implementations, the nodes in the second fully connected network may not be configured with activation functions, so that the second fully connected network can linearly process the transformed channel characteristics and realize compression, In some embodiments, before compressing the transformed channel characteristics by the second fully connected network, the terminal may be further configured to convolve the transformed channel characteristics to obtain convolved transformed channel characteristics. Then, the terminal can compress the convolved transformed channel characteristics to obtain compressed channel characteristics.

In some embodiments, the terminal can convolve the transformed channel characteristics using convolutional neural networks. Convolutional neural network can include input layer, at least one hidden layer and output layer. Those skilled in the art can configure the hidden layer of convolutional neural network according to the actual situation. In some implementations, the at least one hidden layer may include at least one of convolution layer, normalization layer (such as BatchNorm layer, etc.) and activation layer (such as sigmoid, ReLU, etc.).

Convolution neural network can perform local characteristic processing on the transformed channel characteristics, so as to realize the abstraction of local characteristics.

In step S506, the terminal may transmit the compressed channel characteristics as feedback information to the base station.

In some embodiments, before transmitting the feedback information to the base station, the terminal can also digitally encode and modulate the compressed channel characteristics, and then transmit the digitally encoded and modulated compressed channel characteristics to the base station as feedback information.

With the method performed by the terminal provided by the present disclosure, the terminal can compress the channel matrix received from the base station. By transforming the channel matrix into the characteristic domain before compression, the channel data can be transformed into the characteristic domain which is easier to compress, which makes the data compression effect better. More accurate channel data can be recovered when the subsequent base station reconstructs the compressed feedback information.

Figure 6:
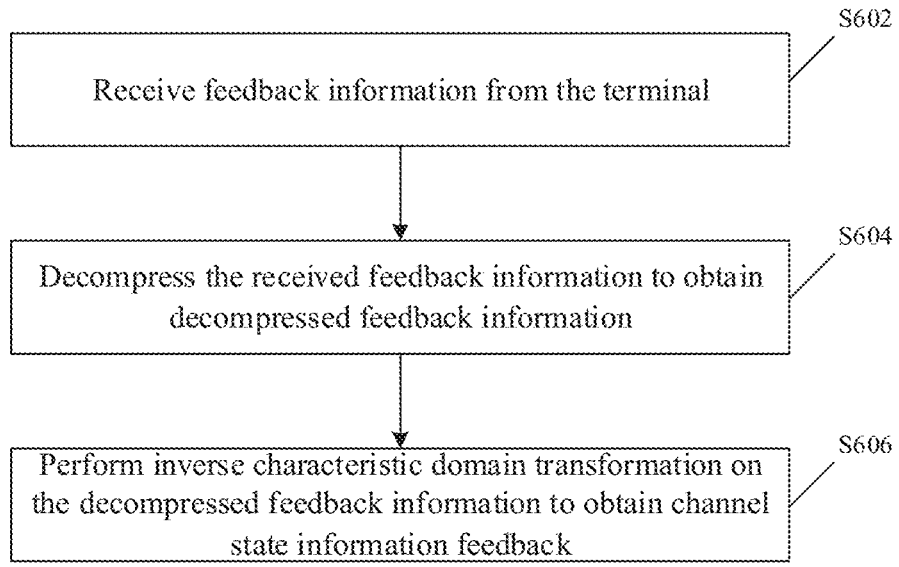
FIG. 6 shows a flowchart of a method 600 executed by a base station according to an embodiment of the present disclosure.

FIG. 6 shows a flowchart of a method 600 executed by a base station according to an embodiment of the present disclosure.

In step S602, the base station may receive feedback information from the terminal. The feedback information here may be feedback information encoded, modulated or quantized by the terminal. In this case, the base station can perform corresponding inverse processing on the encoded, modulated or quantized feedback information to obtain the feedback information.

In step S604, the base station may decompress the received feedback information to obtain decompressed feedback information. In some embodiments, the base station may decompress the feedback information by using the third fully connected network to obtain the decompressed feedback information. Wherein the structure of the third fully connected network can be configured to correspond to that of the second fully connected network, so as to realize the reverse process of the compression process for the second fully connected network. For example, the input layer, at least one intermediate layer and the output layer in the second fully connected layer can be arranged and connected in reverse to determine the structure of the third fully connected network. The parameters of each node in the third fully connected network may be the same as or different from those of the corresponding node in the second fully connected layer.

In step S606, the base station may perform inverse characteristic domain transformation on the decompressed feedback information to obtain channel state information feedback.

in some embodiments, the base station may also denoise the decompressed feedback information before performing inverse characteristic domain transformation on the decompressed feedback information.

In some implementations, the base station may use the second convolutional neural network to convolve the decompressed feedback information to remove possible noise in the decompressed feedback information. In some examples, the second convolutional neural network may include a plurality of convolutional layers in cascade.

In some embodiments, the base station may use the fourth fully connected network to perform inverse characteristic domain transformation on the decompressed feedback information to obtain channel state information feedback. Wherein the structure of the fourth fully connected network can be configured to correspond to that of the first fully connected net Tork, so as to realize the inverse process of characteristic domain transformation for the first fully connected network. For example, the input layer, at least one intermediate layer and the output layer in the first fully connected layer can be arranged and connected in reverse to determine the structure of the fourth fully connected network. The parameters of each node in the fourth fully connected network may be the same as or different from those of the corresponding node in the second fully connected layer.

In some embodiments, when the channel matrix is pre-processed in the terminal, the base station may also perform a post-processing operation corresponding to the inverse of the pre-processing operation on the channel matrix to restore the channel matrix to its original format. For example, the post-processing operation may include the inverse transform of the pre-processing domain transform operation (such as inverse FFT), filling the matrix content removed in the pre-processing process, etc.

With the method executed by the base station provided by the embodiment of the present disclosure, the base station can receive the transformed and compressed channel data as feedback information from the terminal, and can decompress and inverse transform the compressed data according to the inverse process corresponding to the compression process of the terminal to recover the channel data.

Figure 7:
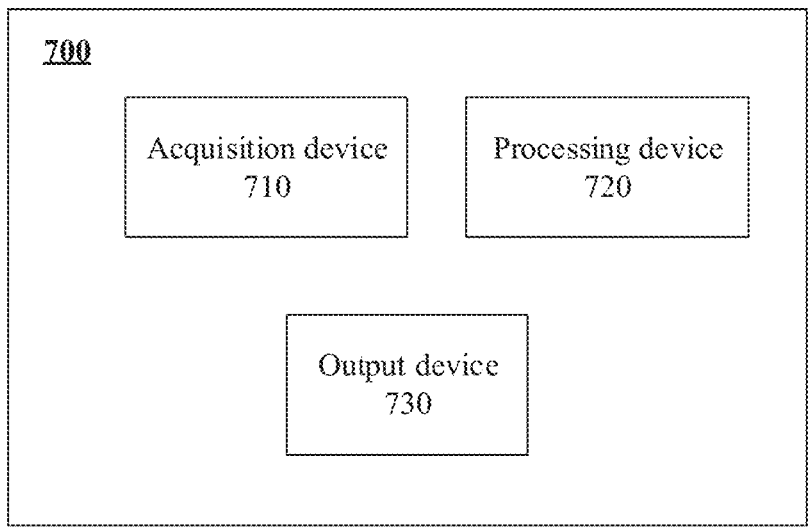
FIG. 7 shows a schematic block diagram of a training apparatus according to an embodiment of the present disclosure.

FIG. 7 shows a schematic block diagram of a training apparatus according to an embodiment of the present disclosure. As shown in FIG. 7, the training apparatus 700 may include an acquisition device 710, a processing device 72.0 and an output device 730.

The acquisition device 710 may be configured to acquire a sample set including a plurality of channel matrix samples. In some embodiments, data can be collected in various different environments as sample data used in the training process. For example, data on the downlink channel sent by the base station can be collected as sample data in various environments such as cities and suburbs. A channel matrix sample for training can be determined based on the sample data.

The processing device 720 may be configured to perform the method. performed by the terminal and the base station described in connection with FIGS. 5 and 6.

The processing device 720 may be configured to transform the channel matrix samples in characteristic domain by using the first neural network to obtain transformed channel training characteristics, and compress the transformed channel training characteristics to obtain compressed channel training characteristics. In some embodiments, the processing device 720 uses the first fully connected network to transform the channel matrix samples in the characteristic domain to obtain the transformed channel training characteristics. The processing device 720 may also be configured to compress the transformed channel training characteristics by using the second fully connected network to obtain compressed channel training characteristics.

The processing device 720 may be configured to decompress the training feedback information by using the second neural network to obtain decompressed training feedback information, and perform inverse characteristic domain transformation on the decompressed training feedback information to obtain channel state information training feedback. In some embodiments, the processing device 720 may be configured to decompress the training feedback information by using a third fully connected network to obtain decompressed training feedback information. The processing device 720 may also be configured to perform inverse characteristic domain transformation on the decompressed training feedback information by using the fourth fully connected network to obtain channel state information training feedback. Parameters of the first fully connected network, the second fully connected network, the third fully connected network and the fourth fully connected network can be adjusted based on the difference between the channel state information training feedback and the channel matrix samples, so as to minimize the difference between the channel state information training feedback and the channel matrix samples.

In some embodiments, before compressing the transformed channel characteristics, the processing device 720 may be further configured to convolve the transformed channel characteristics with the first convolutional neural network to obtain convolved transformed channel characteristics. Then, the processing device 720 may compress the convolved transformed channel characteristics to obtain compressed channel characteristics.

In some embodiments, before performing inverse characteristic domain transformation on the decompressed feedback information, the processing device 720 may be further configured to perform convolution processing on the decompressed feedback information by using a second convolutional neural network to remove possible noise in the decompressed feedback information.

In this case, while adjusting the parameters of the first fully connected network, the second fully connected network, the third fully connected network and the fourth fully connected network, the parameters in the first convolutional neural network and the second convolutional neural network can also be adjusted based on the difference between the channel state information training feedback and the channel matrix samples to minimize the difference between the channel state information training feedback and the channel matrix samples.

The output device 730 may be configured to output the parameters of the trained first neural network and the parameters of the trained second neural network. In some embodiments, the trained first neural network can be deployed to the terminal and the trained second neural network can be deployed to the base station to realize the aforementioned method, the terminal and the base station.

The training apparatus provided in FIG. 7 can be used to adjust the parameters of the terminal, the base station and the network used in the method performed by the terminal and the base station described in connection with FIG. 2-FIG. 6, so that a better compression and reconstruction effect on the channel matrix can be achieved.

Figure 8:
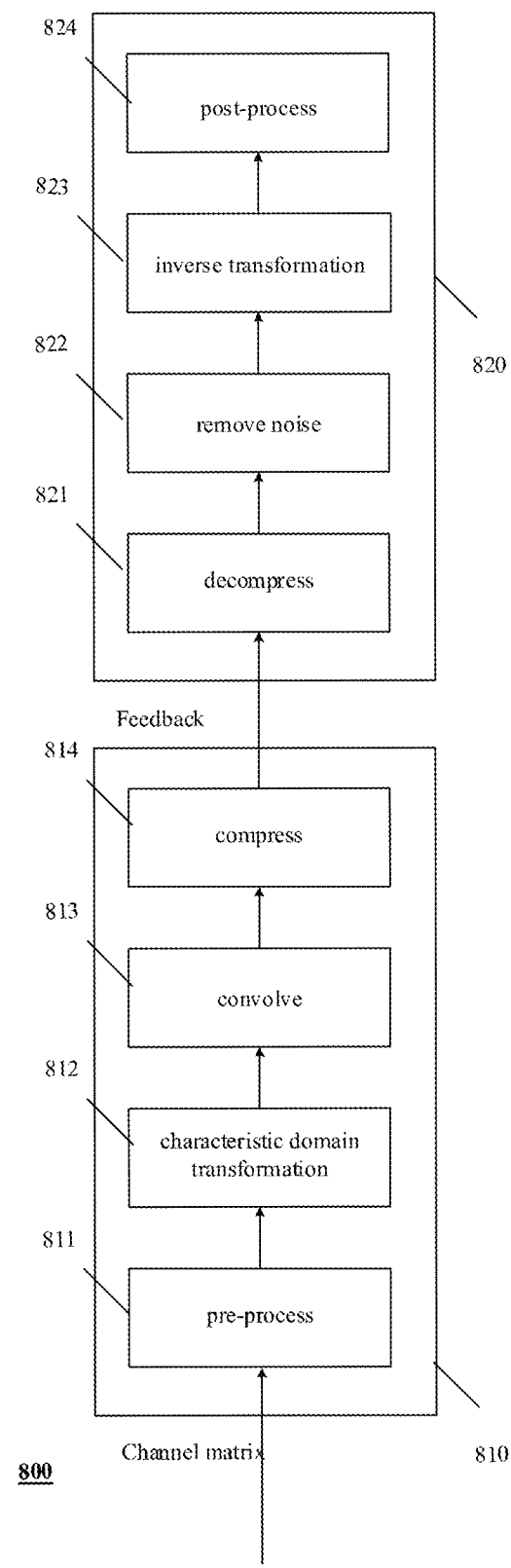
FIG. 8 shows an example of a wireless communication systemaccording to the present disclosure.

FIG. 8 shows an example of a wireless communication system according to the present disclosure. As shown in FIG. 8, the wireless communication system 800 may include a terminal 810 and a base station 820. The terminal 810 may be used to compress the channel matrix received from the base station. The terminal 810 shown in FIG. 8 can be implemented by the terminal 200 described in connection with FIG. 2, and the base station 820 can be implemented by the base station 400 described in connection with FIG. 4.

As shown in FIG. 8, at block 811, the terminal 810 may pre-process the channel matrix to remove unnecessary data.

At block 812, the terminal 810 may perform characteristic domain transformation on the pre-processed channel matrix by using the first fully connected network to obtain transformed channel characteristics. Wherein the size of the transformed channel characteristics is equal to the size of the channel matrix.

At block 813, the terminal 810 may convolve the transformed channel characteristics using the first convolutional neural network to obtain convolved transformed. channel characteristics.

At block 814, the terminal 810 may compress the convolved transformed. channel characteristics using the second fully connected network to obtain compressed channel characteristics.

The terminal 810 may transmit the compressed channel characteristics as feedback information to the base station 820.

At block 821, the base station 820 may decompress the feedback information using the third fully connected network to obtain decompressed feedback information.

At block 822, the base station 820 may convolve the decompressed feedback information by using the second convolutional neural network to remove noise that may exist in the decompressed feedback information.

At block 823, the base station 820 may use the fourth fully connected network to perform inverse characteristic domain transformation on the decompressed feedback information to obtain channel state information feedback.

At block 824, the base station 820 may be configured to perform an inverse operation of the pre-processing operation performed at block 811 to restore the channel matrix to its original format.

Figure 9:
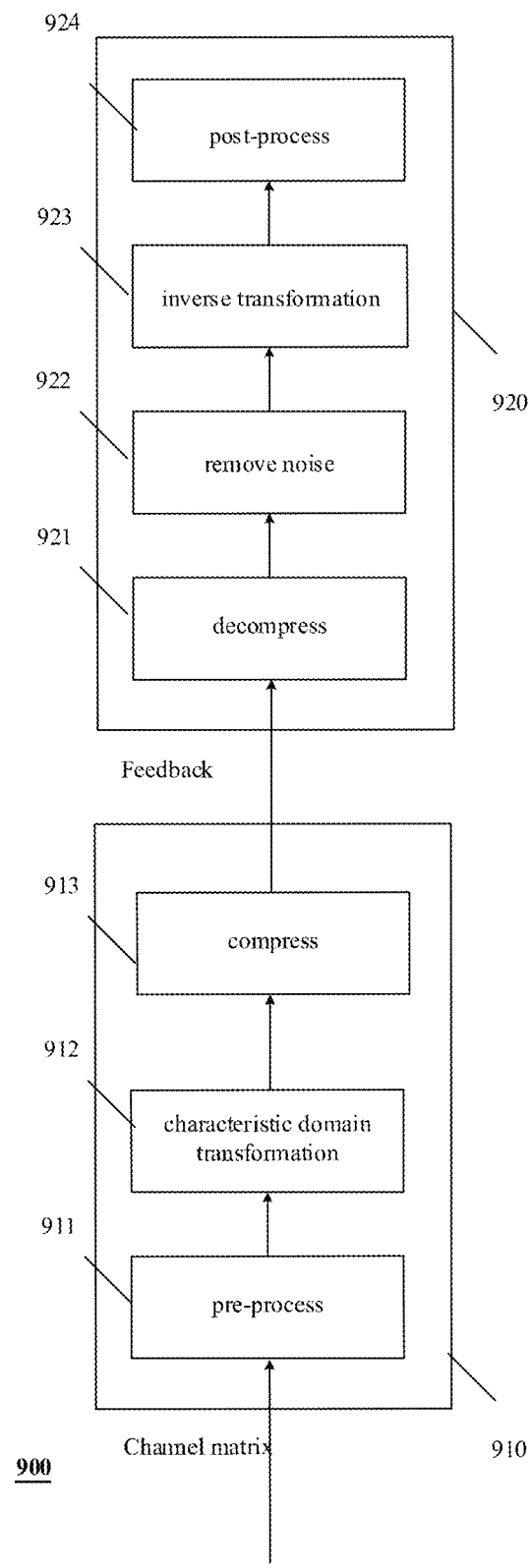
FIG. 9 shows another example of a wireless communication system according to the present disclosure.

FIG. 9 shows another example of a wireless communication system according to the present disclosure. As shown in FIG. 9, the wireless communication system 900 may include a terminal 910 and a base station 920. The terminal 910 may be used to compress the channel matrix received from the base station. The terminal 910 shown in FIG. 9 can be realized by the terminal 200 described in connection with FIG. 2, and the base station 920 can be realized by the base station 400 described in connection with FIG. 4.

As shown in FIG. 9, at block 911, the terminal 910 may pre-process the channel matrix to remove unnecessary data.

At block 912, the terminal 910 may perform characteristic domain transformation on the pre-processed channel matrix by using the first fully connected network to obtain transformed channel characteristics. Wherein the size of the transformed channel characteristics is smaller than the size of the channel matrix.

At block 913, the terminal 910 may compress the transformed channel characteristics using the second fully connected network to obtain compressed channel characteristics.

The terminal 910 may transmit the compressed channel characteristics as feedback information to the base station 920.

At block 921, the base station 920 may decompress the feedback information using the third fully connected network to obtain decompressed feedback information.

At block 922, the base station 920 may convolve the decompressed feedback information by using the second convolutional neural network to remove noise that may exist in the decompressed feedback information, At block 923, the base station 920 may use the fourth fully connected network to perform inverse characteristic domain transformation on the decompressed feedback information to obtain channel state information feedback.

At block 924, the base station 920 may be configured to perform an inverse operation of the pre-processing operation performed at block 911 to restore the channel matrix to its original format.

The difference between the wireless communication system shown in FIG. 9 and the wireless communication system shown in FIG. 8 is that the convolution processing of the transformed channel characteristics is omitted in the method performed by the terminal 910. This method can reduce the complexity of the network used to compress the channel matrix and the training difficulty of the network.

Figure 10A:
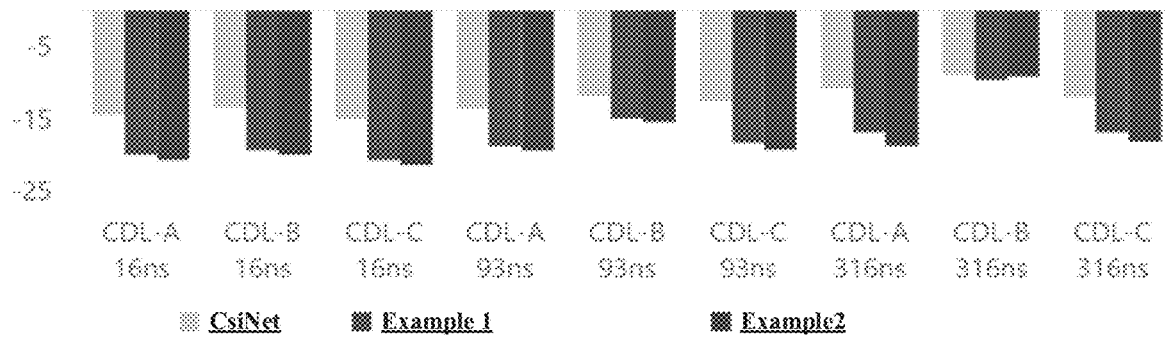
Figure 10B:
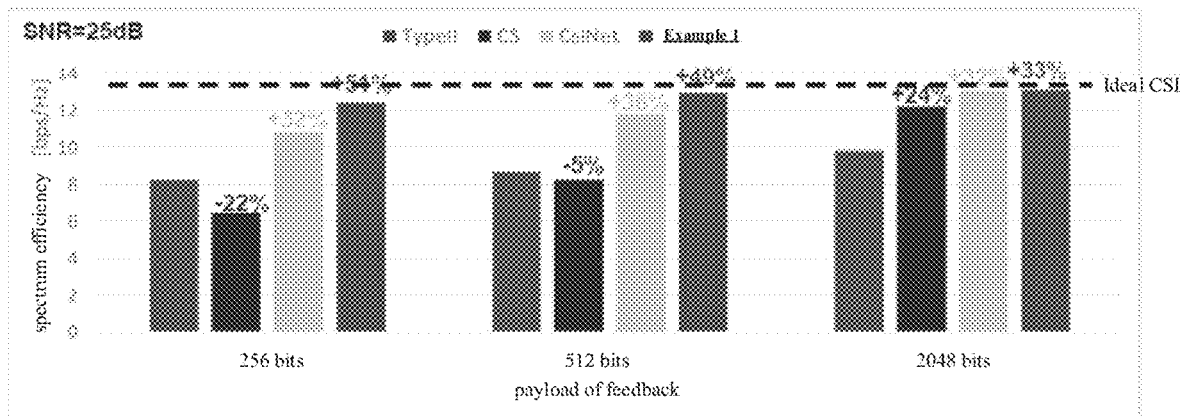
Figure 10C:
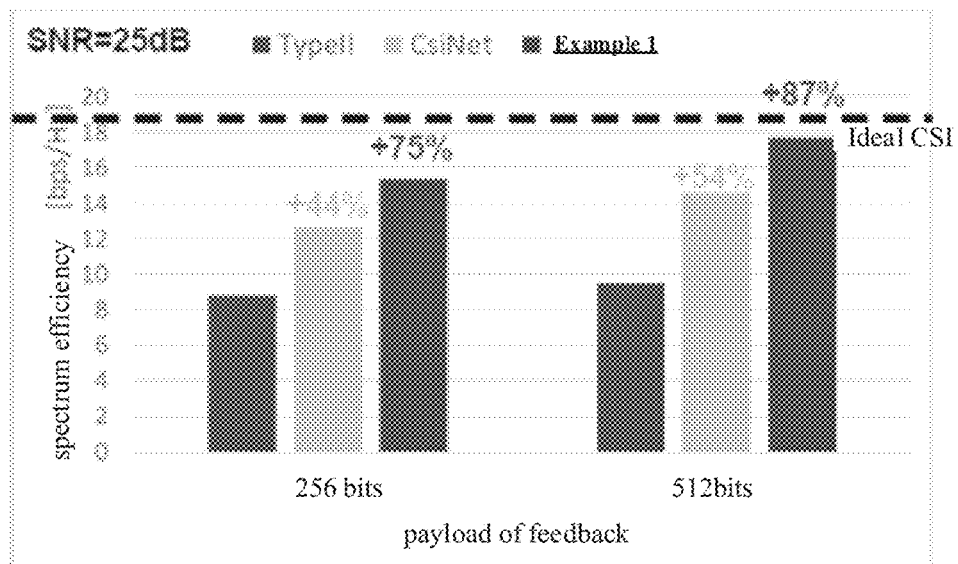

FIGS. 10A-10C illustrate results of performance evaluation of a wireless communication system according to an embodiment of the present disclosure.

FIG. 10A shows the Normalized Mean Square Error (NMSE) of CSI feedback obtained by using CsiNet network, the process shown in FIG. 8 of this disclosure (Example 1) and the process shown in FIG. 9 of this disclosure (Example 2) respectively under different channel models. As shown in 101, the NMSE of CSI feedback generated by CsiNet is the largest, and the NAISE of CSI feedback generated by Example 1 is similar to that generated by Example 2, and the result Obtained by Example 2 is slightly better than that obtained by Example 1.

In the example shown in FIG. 10A, the average normalized mean square error of CSI feedback in different channel models using CsiNet network is −12 dB, while the average normalized mean square error of CSI feedback in Example 1 and Example 2 is −16 dB.

FIG. 10B shows the influence of CSI feedback generated based on different methods on spectrum efficiency in the MU-MIMO system with two UEs. FIG. 10B shows the spectrum efficiency when the payload of feedback is 256 bits, 512 bits and 2048 bits, respectively, when the signal-to-noise ratio (SNR) is 25 dB. It can be seen from FIG. 10B that when the payload of feedback is 256 bits, the spectrum efficiency obtained by CSI feedback based on NR limited feedback method (based on Type II codebook) decreases by 22%, the spectrum efficiency obtained by CSI feedback based on CsiNet network increases by 32%, and the spectrum efficiency obtained by CSI feedback based on the process described in FIG. 8 of this disclosure (Example 1) increases by 54%.

Similarly, when the payload of the feedback is 512 bits and 2048 bits, respectively, the CSI feedback obtained according to Example 1 of this disclosure has the highest spectrum efficiency.

The dotted line shown in FIG. 10B indicates the result of ideal CSI, and it can be seen that the spectral efficiency of CSI feedback obtained according to the method of the present disclosure is close to the result of ideal CSI.

FIG. 10C shows the influence of CSI feedback generated based on different methods on spectrum efficiency in the MU-MIMO system of 4 UE. FIG. 10C shows the spectrum efficiency when the payload of feedback is 256 bits and 512 bits, respectively, when the signal-to-noise ratio (SNR) is 25 dB.

It can be seen that for different feedback payloads, the spectrum efficiency obtained based on CSI feedback obtained according to Example 1 of the present disclosure is the highest, and is closest to the result of ideal CSI (dotted line shown in FIG. 10C).

<Hardware Structure>

In addition, the block diagram used in the description of the above embodiment shows blocks in units of functions. These functional blocks (structural units) are realized by any combination of hardware and/or software. In addition, the implementation means of each functional block is not particularly limited. That is, each functional block can be realized by one device that is physically and/or logically combined, or two or more devices that are physically and/or logically separated can be directly and/or indirectly (for example, by wired and/or wireless) connected to realize the above-mentioned multiple devices.

Figure 11:
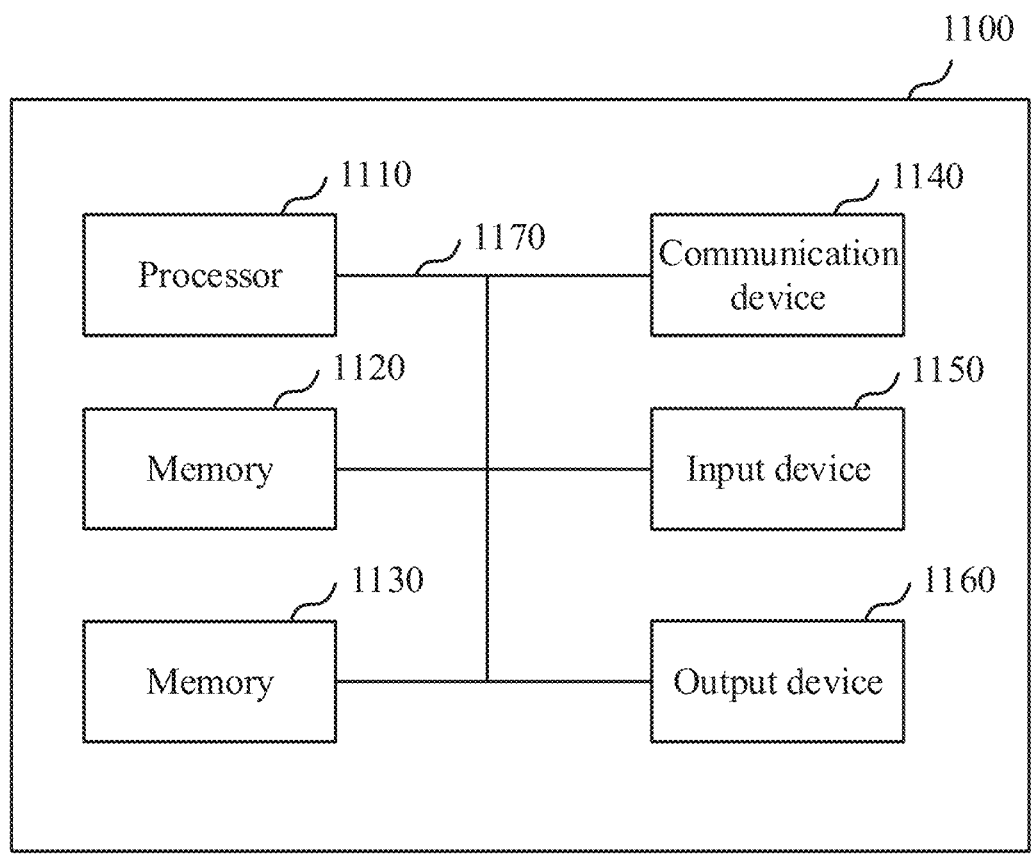
FIG. 11 is a schematic diagram of the hardware structure of the related device according to the embodiment of the present disclosure.

For example, a device of one embodiment of the present disclosure, such as a first communication device, a second communication device, or a flight user terminal, can function as a computer that executes the processing of the wireless communication method of the present disclosure. FIG. 11 is a schematic diagram of the hardware structure of a related. device 1100 (base station or user terminal) according to an embodiment of the present disclosure. The above-mentioned device 1100 (base station or user terminal) can be configured as a computer device that physically includes a processor 1110, a memory 1120, a memory 1130, a communication device 1140, an input device 1150, an output device 1160, a bus 1170 and the like.

In addition, in the following description, the words "device" can be replaced by circuits, devices, units, etc. The hardware structure of the user and the base station may include one or more devices shown in the figure, or may not include some devices.

For example, only one processor 1110 is shown, but it may be a plurality of processors. In addition, the processing may be performed by one processor, or by more than one processor simultaneously, sequentially, or by other methods. In addition, the processor 1110 can be installed by more than one chip.

The functions of the device 1100 are realized, for example, by reading prescribed software (programs) into hardware such as the processor 1110 and the memory 1120, so that the processor 1110 performs operations, controls the communication by the communication device 1140, and controls the reading and/or writing of data in the memory 1120 and the memory 1130.

The processor 1110, for example, makes the operating system work to control the whole computer. The processor 810 may be composed of a central processing unit (CPU) including interfaces with peripheral devices, control devices, arithmetic devices, registers, etc.

In addition, the processor 1110 reads out programs (program codes), software modules, data, etc. from the memory 1130 and/or the communication device 1140 to the memory 1120, and executes various processes according to them. As the program, a program that causes a computer to execute at least part of the actions described in the above embodiment can be adopted.

The memory 1120 is a computer-readable recording medium, for example, it can be composed of at least one of ROM, EPROM, EEPROM, RAM, and other suitable storage media. The memory 1120 can also be called a register, a cache, a main memory (main storage device), and the like. The memory 1120 can store executable programs (program codes), software modules, etc. for implementing the method according to an embodiment of the present disclosure.

The memory 1130 is a computer-readable recording medium, for example, it can be composed of a flexible disk, a floppy disk, a magneto-optical disk (for example, a compact disc ROM, etc.), a digital versatile disk, a Blu-ray, Registered trademark) optical disk), removable disk, hard disk drive, smart card, flash memory device (e.g., card, stick, key driver), magnetic stripe, database, server, and other suitable storage media. The memory 1130 may also be referred to as an auxiliary storage device.

The communication device 1140 is hardware (transmitting and receiving equipment) used to communicate between computers through wired and/or wireless networks, for example, it is also called network equipment, network controller, network card, communication module, etc. The communication device 1140 may include a high-frequency switch, a duplexer, a filter, a frequency synthesizer, etc. in order to realize, for example, Frequency Division Duplex (FDD) and/or Time Division Duplex (TDD). For example, the above-mentioned transmitting unit, receiving unit, etc. can be realized by the communication device 1140.

The input device 1150 is an input device (e.g., keyboard, mouse, microphone, switch, button, sensor, etc.) that accepts input from the outside. The output device 1160 is an output device (for example, a display, a speaker, a Light Emitting Diode (LED) lamp, etc.) that outputs to the outside. In addition, the input device 1150 and the output device 1160 may be an integrated structure (for example, a touch panel).

In addition, various devices such as the processor 1110 and the memory 1120 are connected by a bus 1170 for communicating information. The bus 1170 can be composed of a single bus or different buses between devices.

In addition, the base station and the user terminal may include a microprocessor, a digital signal processor (DSP), an application specific integrated circuit (ASIC), a programmable logic device (PLD), a field programmable gate array (FPGA) and other hardware, through which part or all of each functional block can be realized. For example, the processor 1110 can be installed by at least one of these hardware.

(variant)

In addition, the terms described in this specification and/or the terms required for understanding this specification can be interchanged with terms with the same or similar meanings. For example, channels and/or symbols can also be signals (signaling). In addition, the signal can also be a message. The reference signal can also be referred to as RS (Reference Signal) for short, and can also be called Pilot, pilot signal, etc. according to the applicable standard. In addition, Component Carrier (CC) can also be called cell, frequency carrier, carrier frequency, etc.

In addition, the information, parameters, etc. described in this specification may be expressed by absolute values, relative values to specified values, or other corresponding information. For example, wireless resources can be indicated by a prescribed index. Further, the formulas and the like using these parameters may also be different from those explicitly disclosed in this specification.

The names used for parameters and the like in this specification are not limiting in any way. For example, various channels (PUCCH (Physical Uplink Control Channel), PDCCH (Physical Downlink Control Channel), etc.) and information units can be identified by any appropriate names, so the various names assigned to these various channels and information units are not restrictive in any way.

The information, signals, etc. described in this specification can be represented by any of a variety of different technologies. For example, data, commands, instructions, information, signals, bits, symbols, chips, etc. that may be mentioned in all the above descriptions can be represented by voltages, currents, electromagnetic waves, magnetic fields or particles, optical fields or photons, or any combination thereof.

In addition, information, signals, etc. may be output from the upper layer to the lower layer and/or from the lower layer to the upper layer. Information, signals, etc. can be input or output via multiple network nodes.

Or the input and output information, signals, etc. can be stored in a specific place (such as memory) or managed through a management table. Or input information, signals, etc. can be covered, updated or supplemented. The output information, signals, etc. can be deleted, The input information, signals, etc. can be sent to other devices.

The information notification is not limited to the way/embodiment described in this specification, but can also be carried out by other methods. For example, the notification of information may be through physical layer signaling (e.g., downlink control information (DCI), uplink control information (UCI)), upper layer signaling (e.g., radio resource control (RRC)) signaling, broadcast information (master information block (MIB), system information block (SIB), medium access control (MAC) signaling), other signals or their combination.

In addition, the physical layer signaling can also be called 112 (Layer 1/Layer 2) control information (L1/L2 control signal), L1 control information (L1 control signal), etc. In addition, RRC signaling can also be called RRC message, such as RRC Connection Setup message, RRC Connection Reconfiguration message, etc. In. addition, the MAC signaling can be notified by a MAC control element (MAC CE), for example.

In addition, the notification of the prescribed information (for example, the notification of "X") is not limited to explicit notification, but may also be performed implicitly (for example, by not notifying the prescribed information or by notifying other information), The determination can be made by a value (0 or 1) represented by 1 bit, a true or false value (Boolean value) represented by true or false, or a comparison of numerical values (for example, with a specified value).

Whether software is called software, firmware, middleware, microcode, hardware description language or other names, it should be broadly interpreted as referring to commands, command sets, codes, code segments, program codes, programs, subroutines, software modules, applications, software applications, software packages, routines, subroutines, objects, executable files, execution threads, steps, functions, etc.

In addition, software, commands, information, etc. can be transmitted or received via a transmission medium. For example, when using wired technology (coaxial cable, optical cable, twisted pair, Digital Subscriber Line, etc.) and/or wireless technology (infrared, microwave, etc.) to transmit software from websites, servers, or other remote resources, these wired technologies and/or wireless technologies are included in the definition of transmission media.

The terms "system" and "network" used in this specification can be used. interchangeably.

In this specification, the terms BS, radio Base Station, eNB, gNB, cell, sector, cell group, carrier and component carrier can be used interchangeably. Sometimes, the base station is also called by terms such as fixed station, eNodeB (eNB), access point, transmitting point, receiving point, femtocell, small cell, etc.

A base station can accommodate one or more (e.g., three) cells (also called sectors). When a base station accommodates a plurality of cells, the entire coverage area of the base station can be divided into a plurality of smaller areas, and each smaller area can also provide communication services through a base station subsystem (for example, indoor small base station (RRH, Remote Radio Head)). The term "cell" or "sector" refers to a part or the whole of the coverage area of the base station and/or base station subsystem that performs communication services in this coverage.

In this specification, the terms "Mobile Station", "user terminal", "User Equipment" and "terminal" can be used interchangeably. Mobile stations are sometimes referred to by those skilled in the art as subscriber stations, mobile units, subscriber units, wireless units, remote units, mobile devices, wireless devices, wireless communication devices, remote devices, mobile subscriber stations, access terminals, mobile terminals, wireless terminals, remote terminals, handsets, user agents, mobile clients, clients or some other appropriate terms.

In addition, the wireless base station in this specification can also be replaced by a user terminal. For example, the various modes/embodiments of the present disclosure can also be applied to the configuration in which the communication between the wireless base station and the user terminal is replaced by the communication between a plurality of user terminals (D2D). At this time, the functions of the first communication device or the second communication device in the above-mentioned device 800 can be regarded as the functions of the user terminal. In addition, words such as "rap" and "down" can also be replaced by "side". For example, the uplink channel can also be replaced by the side channel.

Similarly, the user terminal in this specification can also be replaced by a wireless base station. At this time, the functions of the above user terminal can be regarded as the functions of the first communication device or the second communication device.

In this specification, it is assumed that the specific operation performed by the base station may also be performed by its upper node according to the situation, Obviously, in a network composed of one or more network nodes with a base station, various actions for communication with terminals can be performed through the base station, more than one network node other than the base station (Mobility Management Entity (MMF), Serving-Gateway (S-GW), etc. can be considered, but not limited to this), or their combination.

The modeslembodiments described in this specification can be used alone, in combination, or switched during execution. In addition, the processing steps, sequences, flow charts, etc, of each mode/embodiment described in this specification can be changed as long as there is no contradiction. For example, regarding the method described in this specification, various step units are given in an exemplary order, but not limited to the given specific order.

The modes/embodiments described in this specification can be applied to Long Term Evolution (LYE), LTE-A (LTE-Advanced), LTE-B (Beyond Long Term Evolution), LTE-Beyond), SUPER 3G, 1MT-Advanced, 4th Generation Mobile Communication System (4G), 5th Generation Mobile Communication System (5G, Th generation mobile communication system), Future Radio Access (FRA), new Radio Access Technology (New-RAT), New Radio((NR), new radio access (NX, New radio access), Future generation radio access (FX), Global System for Mobile Communications (GSM (registered trademark), Global system for mobile communications), code division multiple access 3000 (CDMA3000), ultra mobile broadband (UMB, Mobile Broadband), IEEE 920.11 (Wi-Fi (registered trademark)), IEEE 920.16 (WIMAX (registered trademark)), IEEE 920.20, UWB (Ultra-WideBand), Bluetooth (registered trademark), other suitable wireless communication methods, and/or systems extended based on them.

The record of "according to" used in this specification does not mean "only according to" as long as it is not explicitly stated in other paragraphs. in other words, records like "according to" refer to "only according to" and "at least according to".

Any reference to units with names such as "first" and "second" used in this specification is not a comprehensive limitation on the number or order of these units. These names can be used in this specification as a convenient way to distinguish more than two units. Therefore, the reference of the first unit and the second unit does not mean that only two units can be used or that the first unit must precede the second unit in some forms.

The term "determining" used in this specification sometimes includes various actions. For example, regarding "determination", calculation, calculation, processing, derivation, investigating, searching up (such as searching in tables, databases, or other data structures), ascertaining, and the like can be used. In addition, regarding "determination", receiving (e.g., receiving information), transmitting (e.g., tra.nsmitting information), inputting, outputting, accessing (e.g., accessing data in memory), etc. can also be regarded as making "determination". In addition, regarding "determination", resolving, selecting, choosing, establishing, comparing, etc. can also be regarded as "determination". That is to say, regarding "judgment (determination)", several actions can be regarded as "judgment (determination)".

As used in this specification, terms such as "connected" and "coupled" or any variation thereof refer to any direct or indirect connection or combination between two or more units, which may include the following situations: there are one or more intermediate units between two units that are "connected" or "coupled" with each other. The combination or connection between units can be physical, logical, or a combination of both. For example, "connect" can also be replaced with "access". As used in this specification, it can be considered that two units are "connected" or "combined" with each other by using one or more wires, cables, and/or printed electrical connections, and as several non-limiting and non-exhaustive examples, by using electromagnetic energy with the wavelength of radio frequency region, microwave region, and/or light (both visible light and invisible light) region, etc.

When "including", "including" and their variations are used in this specification or claims, these terms are as open as the term "having". Further, the term "or" used in this specification or claims is not exclusive or.

The above disclosure has been described in detail, but it is obvious to those skilled in the art that the disclosure is not limited to the embodiments described in this specification. This disclosure can be implemented as modifications and changes without departing from the purpose and scope of this disclosure as determined by the claims. Therefore, the description of this specification is for the purpose of illustration, and does not have any restrictive meaning for this disclosure.

What is claimed is:

1. A terminal comprising:
  a processor configured to
    perform a characteristic domain transformation on a channel matrix to obtain transformed channel characteristics;
    compress the transformed channel characteristics to obtain compressed channel characteristics;
  a transmitting unit configured to transmit the compressed channel characteristics as feedback information to a base station,
  wherein the processor is configured to:

convolve the transformed channel characteristics to obtain convolved transformed channel characteristics, and compress the convolved transformed channel characteristics to obtain compressed channel characteristics.

2. The terminal according to claim 1, wherein the processor is configured to perform the characteristic domain transformation on the channel matrix by using a first fully connected network.

3. The terminal according to claim 2, wherein the transformed channel characteristics and the channel matrix have a same size.

4. The terminal according to claim 2, wherein a size of the transformed channel characteristics is smaller than a size of the channel matrix.

5. The terminal according to claim 1, wherein the processor compresses the transformed channel characteristics using a second fully connected network.

6. A base station comprising:
a receiving unit configured to receive feedback information from a terminal, wherein the feedback information is obtained by the terminal through the following operations: performing a characteristic domain transformation on a channel matrix to obtain transformed channel characteristics, convolving the transformed channel characteristics to obtain convolved transformed channel characteristics, compressing the convolved transformed channel characteristics to obtain compressed channel characteristics, and taking the compressed channel characteristics as the feedback information;
a processor configured to:
decompress the feedback information to obtain decompressed feedback information;
perform an inverse characteristic domain transformation on the decompressed feedback information to obtain channel state information feedback.

7. The base station according to claim 6, wherein the processor is configured to decompress the feedback information by using a third fully connected network to obtain decompressed feedback information.

8. The base station according to claim 6, wherein before performing the inverse characteristic domain transformation on the decompressed feedback information, the processor is further configured to:

perform a denoising processing on the decompressed feedback information.

9. The base station according to claim 6, wherein the processor is configured to perform the inverse characteristic domain transformation on the decompressed feedback information by using a fourth fully connected network to obtain channel state information feedback.

10. A method executed by a base station, comprising:
receiving feedback information from a terminal, wherein the feedback information is obtained by the terminal through the following operations: performing a characteristic domain transformation on a channel matrix to obtain transformed channel characteristics, convolving the transformed channel characteristics to obtain convolved transformed channel characteristics, compressing the convolved transformed channel characteristics to obtain compressed channel characteristics, and taking the compressed channel characteristics as the feedback information;
decompressing the feedback information to obtain decompressed feedback information;
performing an inverse characteristic domain transformation on the decompressed feedback information to obtain channel state information feedback.

11. The method according to claim 10, wherein decompressing the feedback information to obtain decompressed feedback information comprises:
decompressing the feedback information by using a third fully connected network to obtain decompressed feedback information.

12. The method according to claim 10, further comprising:
before performing the inverse characteristic domain transformation on the decompressed feedback information, performing a denoising processing on the decompressed feedback information.

13. The method according to claim 10, wherein performing an inverse characteristic domain transformation on the decompressed feedback information to obtain channel state information feedback comprises:
performing the inverse characteristic domain transformation on the decompressed feedback information by using a fourth fully connected network to obtain channel state information feedback.

* * * * *